United States Patent [19]
Howe

[11] 3,768,365
[45] Oct. 30, 1973

[54] APPARATUS FOR PROVIDING PARTIAL SLITS IN CORRUGATED DRAIN PIPE

[75] Inventor: Charles Wesley Howe, Tujunga, Calif.

[73] Assignee: Vern Emery Company, Inc., Pacoima, Calif.

[22] Filed: Jan. 24, 1972

[21] Appl. No.: 220,354

[52] U.S. Cl. ............... 90/15.1 R, 90/21 R, 83/1, 83/54, 83/278, 83/261, 83/367, 83/678
[51] Int. Cl. ...... B23c 1/14, B26d 3/06, B23d 25/16
[58] Field of Search ................ 83/54, 202, 236, 83/260, 261, 278, 367, 423, 678, 926 R, 1; 90/15.1 R, 21 R

[56] References Cited
UNITED STATES PATENTS

| | | | |
|---|---|---|---|
| 2,161,123 | 6/1939 | Avery et al. | 83/236 |
| 3,370,491 | 2/1968 | Cross | 83/54 X |
| 3,545,336 | 12/1970 | Savko | 83/54 X |

Primary Examiner—Willie G. Abercrombie
Attorney—William H. Pavitt, Jr. et al.

[57] ABSTRACT

Apparatus for providing a plurality of partial slits about the periphery of continuous corrugated drain pipe comprising a plurality of rotating blades which are oscillated simultaneously by coordinated linkage systems which are controlled by a main drive. The main drive also controls a work feed system comprising a pair of opposed sprockets which cooperate with the corrugated surface of the pipe to move it past the cutters. The overall machine speed is controlled by a dancer roller which actuates a potentiometer system in accordance with the catenary of the pipe between the pipe extruder and the slitting apparatus.

16 Claims, 7 Drawing Figures

APPARATUS FOR PROVIDING PARTIAL SLITS IN CORRUGATED DRAIN PIPE

BACKGROUND OF THE INVENTION

When draining swamps and bogs, it is necessary to provide some conduit by means of which the water can flow to a lower elevation and thus be drained away. In the past, this has often required the use of large and costly pumps and/or extensive time and labor to dig trenches, lay pipes, etc.

Recently, it has been found that such areas can be economically drained by means of a relatively flexible corrugated plastic pipe which requires only that the pitch of the pipe be continuously down-hill from the bog to the area into which the water is to be passed.

It has also been found that the provision of slits at predetermined locations in the pipes will substantially increase the amount of water which may be passed through the pipes for movement toward the receptacle area and that the slits eliminate the need for any pumping system since they allow the water to flow under the force of gravity only.

Such pipe can be formed and laid in a single continuous length having any radial and axial dimension desired and can easily be bent around trees or other objects along a smooth radius.

Ideally, slits are provided along the entire periphery of the pipe at predetermined intervals such as within every other groove between the ridges along the corrugated pipe. Placement of the slits in the grooves allows the pipe to be supported on the ground by the ridges without clogging the slits with silt.

It has thus become necessary to provide a suitable apparatus to produce the desired partial slitting at a speed substantially equal to that at which the pipe is extruded from the forming die so that the pipe may be transformed from raw material to a completed product in a substantially unitized mechanical operation.

SUMMARY OF THE INVENTION

The present invention relates to a machine which receives corrugated flexible pipe from an extrusion system and partially slits the pipe at a plurality of locations about the periphery of every other groove in the corrugated surface. In somewhat greater detail, the invention comprises a machine which is controlled by a dancer mechanism which is oscillatibly actuated in accordance with the radius of the catenary of the pipe as it passes from the manufacturing line to the slitter mechanism. The pipe is drawn through the slitter by a pair of oscillating and rotating drive sprockets which cooperate with the ridges and grooves of the corrugated surface of the pipe.

A plurality of double-mounted rotating slitters are mounted on oscillatable arms at predetermined locations about the axis of the path of travel of the pipe as it is drawn through the slitting machine. As the pipe is drawn forward by the drive sprockets, the slitters are positioned away from the pipe travel axis. As the rotating drive sprockets are oscillated back toward their starting position so as to draw the pipe along the path of travel, the slitters are moved toward the axis of the pipe travel path and partial slits are formed in the grooves of the corrugated pipe surface. When the drive sprockets reach their starting position, the slitter arms are moved away from the travel path axis and the cycle is begun again.

In the preferred embodiment of the present invention, each slitter arm carries a pair of slitter blades so that when the blades are moved toward the travel path axis, two partial slits are formed in the first and third of four consecutive grooves. When the pipe is then drawn forward by the drive sprocket, a similar slitting is performed in the first and third grooves of the next four grooves. Thus, as the pipe is drawn through the machine, a plurality of partial slits are formed about the periphery of every other groove along the length of the pipe.

After the pipe is drawn away from the slitting machine, it can be packaged in any suitable manner and/or it can be cut into predetermined lengths for shipment and distribution.

In a machine formed in accordance with the present invention, a single motor drives a transmission system to actuate a first cam which acts against the drive sprocket mechanism for oscillation thereof. The shaft upon which the first cam is mounted can also be used to deliver power to the shafts upon which the drive sprockets are mounted for rotation thereof. Furhter, the same shaft can also be used to provide power to a second cam which actuates a control linkage to oscillate the slitter arms.

Although adequate power to drive the slitters could be derived from the single drive system, in many instances it will probably be more feasible to provide a single small drive motor in each slitter arm to cause rotation of the slitter blades.

The timing between the pipe drive system and the slitter blade oscillation can be controlled by any suitable device. For example, a cog belt system can be used to transmit the rotational power to the drive sprockets and a mechanical adjustment system can be provided to control the lateral location of the cog belt and thus control the precise angular relationship of the rotation of the drive sprockets relative to the time of slitter actuation.

This invention, together with further modes, embodiments, objects, and advantages will readily be understood by those skilled in the art upon perusal of the following Detailed Description, taken together with the accompanying drawings, which illustrate what is presently considered to be the preferred embodiment of the best mode contemplated for utilizing the novel principles of the invention which is defined only by the claims.

DETAILED DESCRIPTION

Figure 1:
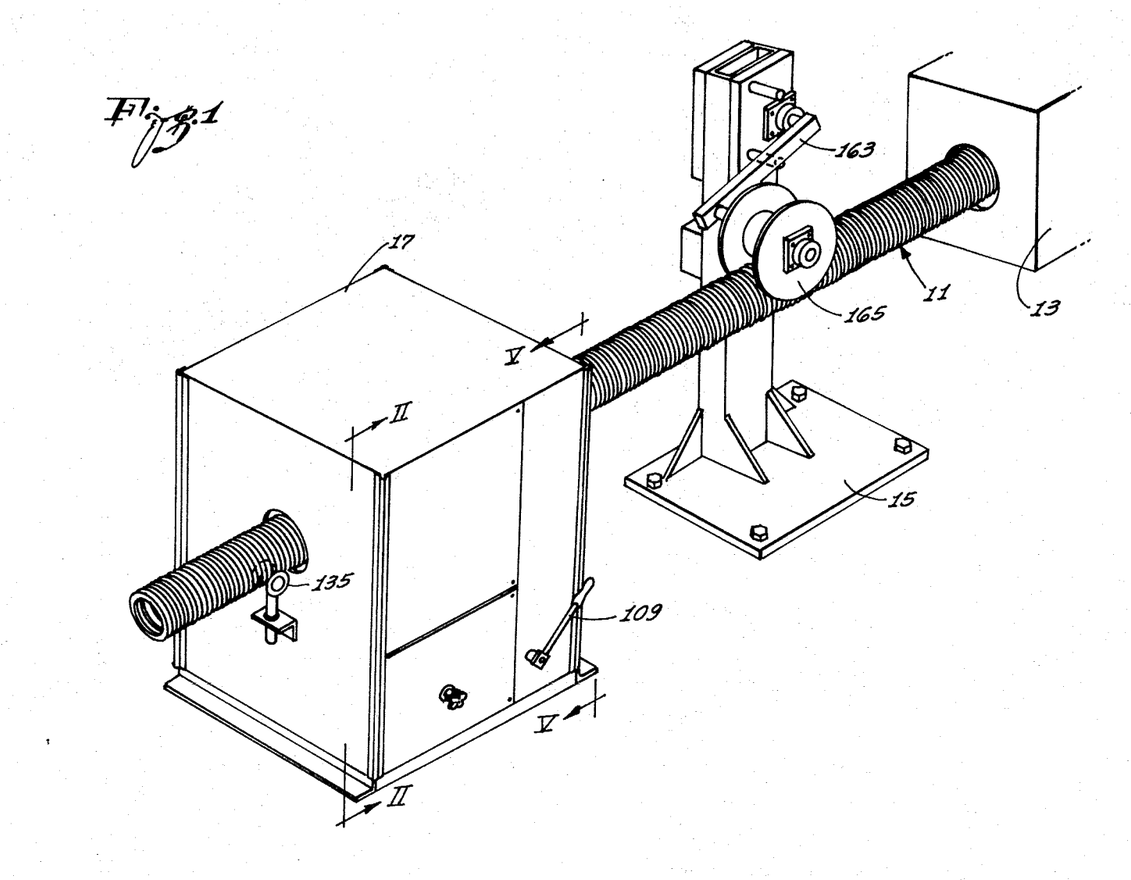
FIG. 1 is a perspective view of the combination of machines utilized to form corrugated pipe in accordance with the present invention.
Figures 6, 7:
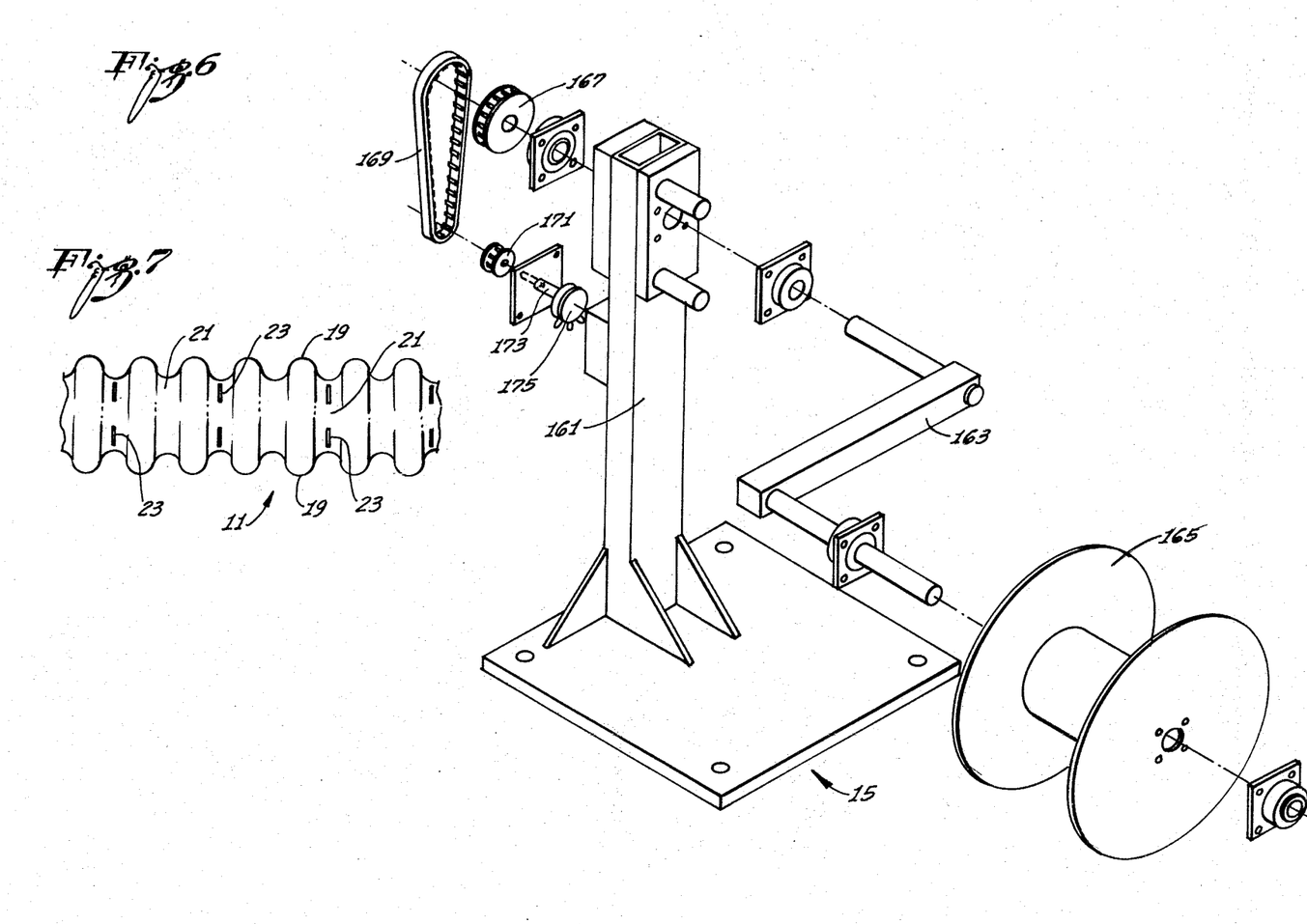
FIG. 6 comprises an exploded view of the dancer mechanism which controls the speed at which the slitting machine is driven.
FIG. 7 comprises a side elevation of a corrugated pipe illustrating the slits formed therein.

A corrugated pipe 11 is moved from an extrusion die or manufacturing device 13, past a dancer 15 and through a slitting machine 17 as shown in FIG. 1. The pipe is formed with a plurality of ridges 10 and grooves 21, as shown in FIG. 7, and as the pipe passes through the slitter machine 17, every other groove 21 is provided with a plurality of partial slits 23 about the periphery thereof. Thus, reference to FIG. 7 reveals that the pipe may be supported on the ground by ridges 19 without shutting off or clogging any of the slits 23, thereby allowing water to enter the pipe 11 to drain an area in which the pipe is laid.

In order to provide a point of reference, the side of the slitter machine 17 from which the pipe 11 is withdrawn (the lower left corner of FIG. 1) shall be referred to as the "front" of the machine, the side into which the extruded pipe passes for slitting shall be referred to as the "back" of the machine. Thus, with the machine partially broken away, a person standing at the front of the machine would see the structure shown in FIG. 2 and a person standing at the rear of the machine would see the structure illustrated in FIG. 5.

Referring now to FIGS. 2–5 in greater detail, it is seen that the slitter machine 17 basically comprises a frame structure 30 upon which is mounted a drive motor 31 which provides a power input to a gear box 33 through a timing belt 35. In turn, the gear box 33 drives a cam shaft 37 which produces an input to a second gear box 39. A cam 41 is shown mounted on the shaft 37 for use in drawing the pipe through the slitting machine in a manner to be described below. If desired, an identical cam (not shown) can be mounted on the opposite end of the shaft 37 to produce a more balanced camming action on the pipe-moving mechanism.

Gear box 39 drives an output shaft 43 upon which is mounted a pulley 45 which drives a timing belt 47 for providing rotational motion to the pipe moving apparatus in a manner to be described below.

Figure 3:
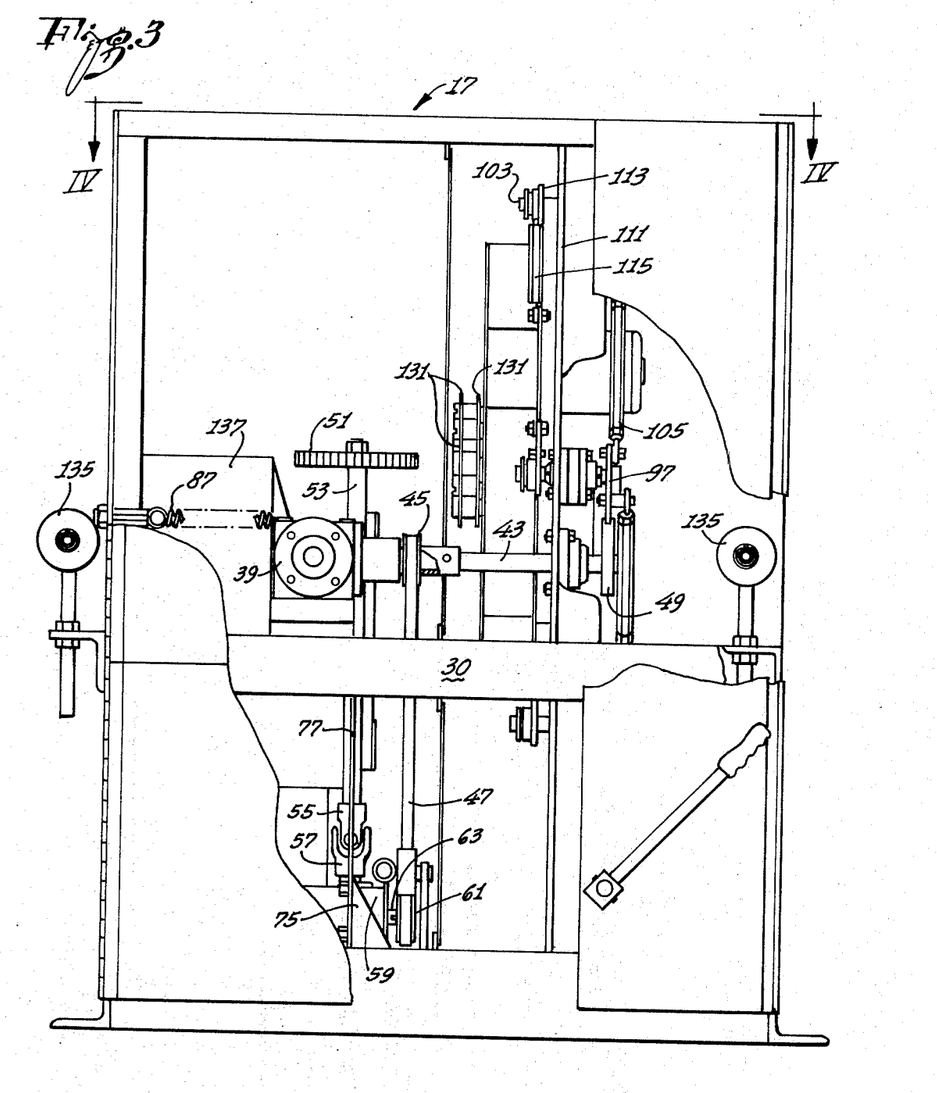
FIG. 3 is a partial view of the machine as seen along a line III—III of FIG. 2.
Figure 5:
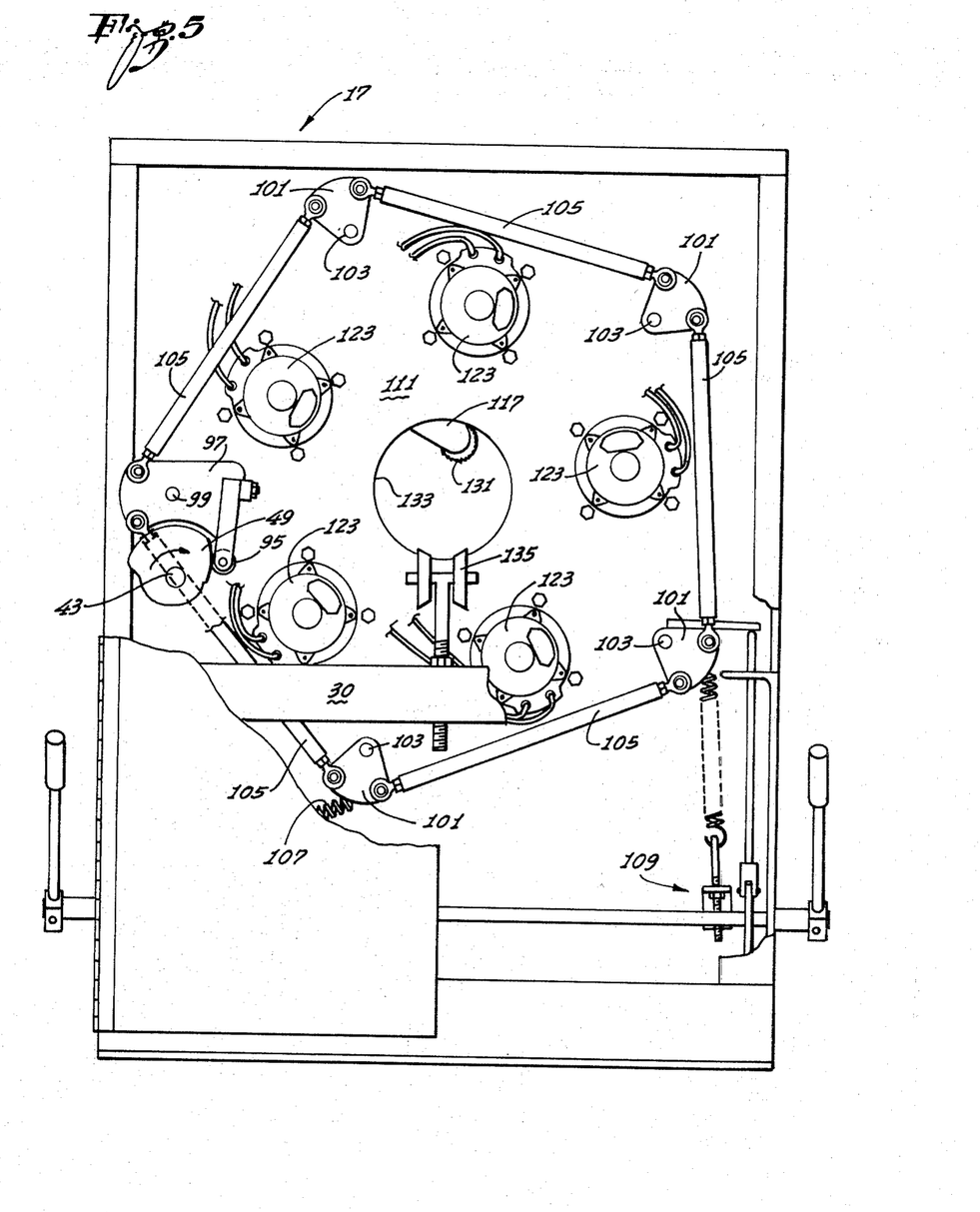
FIG. 5 comprises a partial vertical section of the machine as seen along a line V—V of FIG. 1.

As shown in FIGS. 3 and 5, a slitter arm cam 49 is also mounted on the shaft 43 to cause oscillation of the slitting arms as will also be described below.

The pipe moving apparatus comprises a pair of drive sprockets 51 having teeth thereon which fit around the ridges 19 and into the grooves 21 of the corrugated pipe 11. Each sprocket is mounted on a shaft 53 which is connected at a universal joint 55 to a drive shaft 57. Each of the drive shafts 57 comprises the output shaft of a gear box 59.

Figure 2:
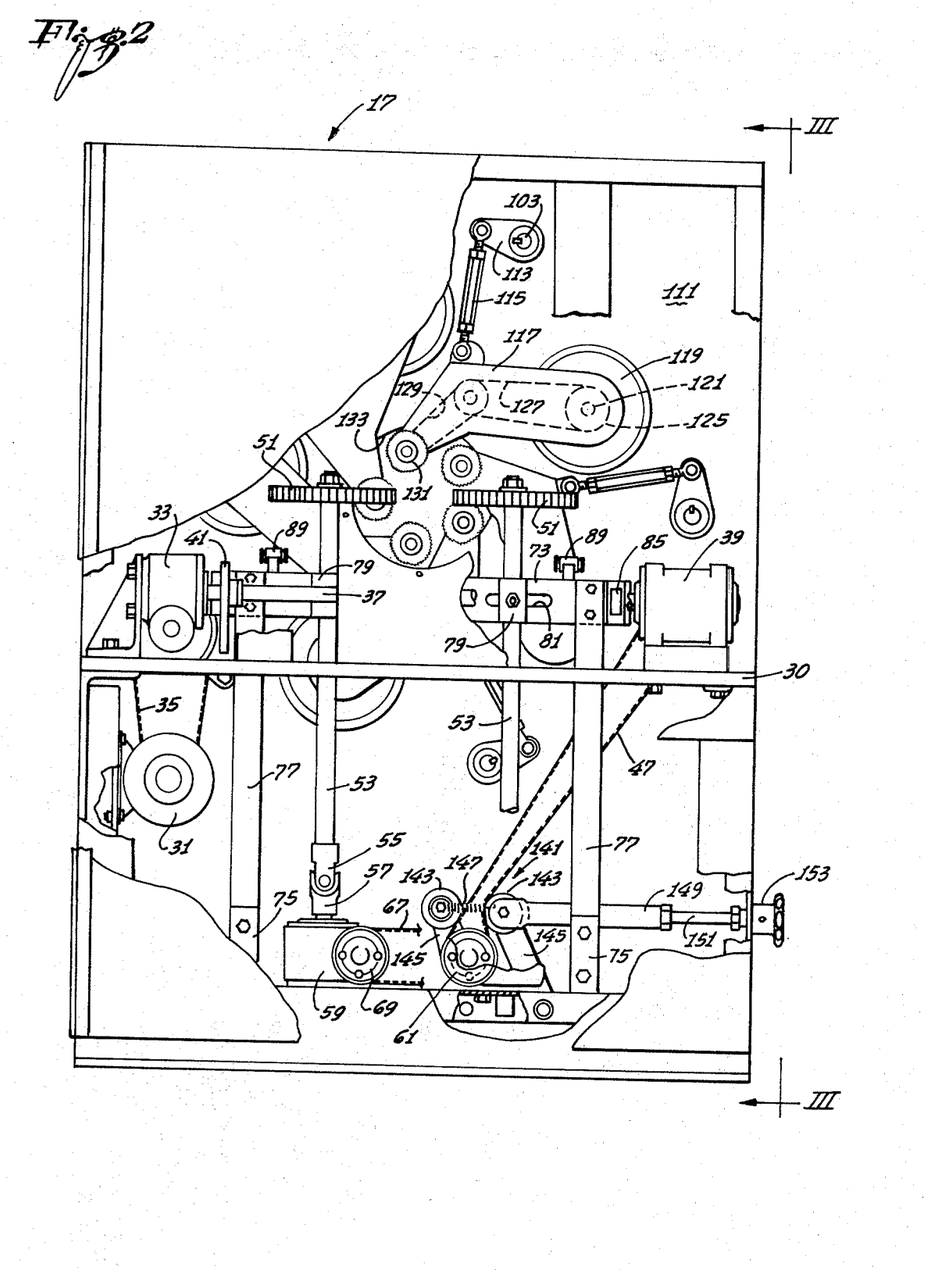
FIG. 2 is a partial view of the internal portion of the slitting machine, shown along a line II—II of FIG. 1, illustrating the relationship between the pipe drive mechanism and the slitters.

The timing belt 47 which is driven by the pulley 45 on output shaft 43 of gear box 39 provides power to a pulley 61 which is mounted on a shaft 63 (FIG. 3). Shaft 63 is the input shaft of the gear box 59 which drives the right-hand drive sprocket 51 as seen in FIG. 2.

An output shaft 64 (FIG. 4) from the right-hand gear box 59 is provided with a pulley 65 which drives a timing belt 67. Belt 67, in turn, drives a pulley 69 which delivers input power to the left-hand gear box 59, as viewed in FIG. 2. Thus, power delevered to the gear box 39 by the shaft 37 is transmitted via the timing belts 47 and 67 to both of the gear boxes 59 for rotation of the drive sprockets 51.

Figure 4:
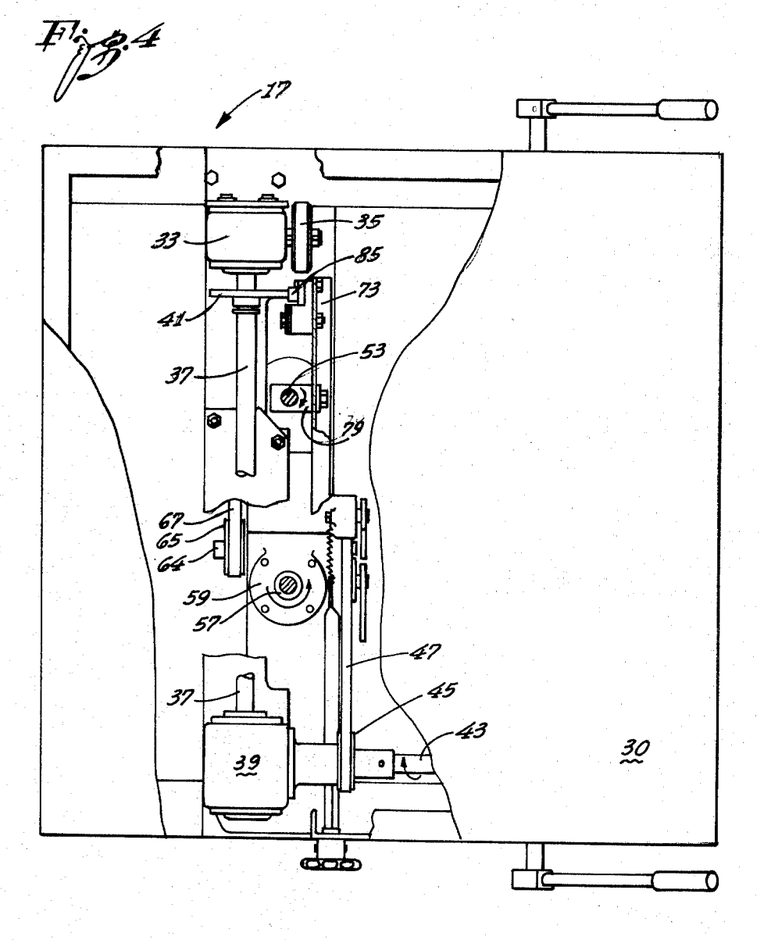
FIG. 4 is a partial view of a horizontal section of the machine, as seen along a line IV—IV of FIG. 3 with parts thereof removed so as to show further details.

A support member 73 is attached to a pair of brackets 75 mounted on the base of the machine frame 30 by means of a pair of leaf springs 77. A pair of bearing blocks 79 are adjustably mounted in a corresponding pair of slots 81 in the support member 73 and are provided with suitable bearings through which the drive shafts 53 extend. The drive shafts 53 pass through the bearing blocks in such a way that they may be rotated and axially moved therein. Thus, as the drive sprockets are oscillated, shafts 53 can freely slide through the bearing blocks 79 which hold the shafts in the upright positions shown.

As stated previously, the cams 41 which are rotated by the shafts 37 are utilized to oscillate the drive sprockets. The cams 41 cooperate with a corresponding pair of cam followers or rollers 85 mounted on the support member 73. As the cams rotate, the support member will be oscillated toward and away from a person viewing FIG. 2 and toward the right and left of a person viewing FIG. 3. One or more springs 87 (FIG. 3) may be suitably attached to the support members 73 at spring anchors 89 to tend to maintain the drive system in the upright position at the limit of travel away from the slitter mechanism as shwon.

Although those skilled in the art will now understand the operation of the drive system from the above description, it will be realized that motor 31, via timing belt 35 and gear box 33 will drive the shaft 37. Cams 41 mounted on the shaft will cooperate with the cam followers 85 on the support member 83 to oscillate the support member along a curved plane extending between the front and rear ends of the slitting machine 17. The curved plane will be substantially tangent to the axis of the path of travel of a pipe through the machine. Shaft 37 will also drive gear box 39 and, thereby, a timing belt 47 which will cause each drive drive shaft 53 to rotate about their axes.

In other words, the described structure causes the drive shafts to rotate and to oscillate since they are captured within the bearing blocks 79 attached to the support member 73.

A person viewing FIG. 2 will see the sprockets 51 being rotated toward him from the center of the figure around to the sides of the machine. Therefore, as they are oscillated toward that viewer, they will drive a pipe which is captured therebetween toward him. Upon completion of the oscillation of the drive sprockets toward the viewer, the oscillation of the support member and thus the drive sprockets away from the viewer will commence. A proper timing of the speed of oscillation and rotation of the drive sprockets will allow the drive sprockets to merely "walk" along the surface of the pipe without moving it until the oscillation toward the rear of the machine is completed. Continuing to rotate, the drive sprockets 51 will then begin to move toward the front of the machine once again, thereby drawing the pipe with it as it does so. In other words, the pipe is drawn through the slitting machine in a cyclic motion which includes a fully stopped position during each cycle. When the pipe is fully stopped, slitting of its circumference can be accomplished as will now be described.

Referring again to FIGS. 3 and 5, as slitter arm cam 49 is rotated by shaft 43, a cam follower 95 mounted on a main crank 97 is actuated by the cam to pivot the main crank about a pivot pin 99. Movement of the main crank 97 causes similar movement of a plurality of secondary cranks 101 about their respective pivots 103 by connecting devices 105 which, if desired, may be adjustable. This linkage system is retained in the position illustrated so that the cam follower 95 maintains close contact with the cam 49 due to the influence of one or more springs 107 attached to the cranks 97 and/or 101.

If desired, an over-center throw out linkage 109 may be attached to one or more of the cranks to positively separate the cam follower 95 from the surface of the cam 49 and prevent oscillation of the slitter arms.

The pivot pins 103 and the pivot pin 99 are rotatably mounted in a wall 111 of the machine 17 and a second crank 113 is mounted on the end of the pivot pins on the opposite side of the wall from the cranks 101 and 97 (FIG. 2). An adjustable turnbuckle-like device 115 is pivotally attached to the cranks 113 at one end thereof and is pivotally attached to a slitter arm 117 at the other end thereof.

Each slitter arm is pivotally attached to a plate 119 which is pivoted against the surface of wall 111. A motor shaft 121, extending through the wall 111 and each pivot plate 119 is driven by a motor 123 mounted on the backside of the wall. Each motor shaft 121 drives a pulley or sprocket 125 which is mounted thereon for transmission of power from the motors 123 through belt or chains 127 and 129 to a pair of coaxial slitter blades 131 on the end of each arm.

Thus, the slitter blades 131 are in constant rotation as a result of the power transmitted to them from the motors 123. Also, the saw arms 117 are cyclically oscillated toward and away from the axis of an opening 133 in the wall 111 through which the corrugated pipe is passed.

A pair of supporting rollers 135 are shown at either side of the machine (FIG. 3) to support the corrugated pipe. If desired, a tubular or channel alignment device 137 may also be provided within the machine on either or both sides of the wall 111.

In operation, as a corrugated pipe passes from the rear to the front of the machine, it is drawn through the opening 133 of wall 111 by the above-described oscillation and rotation of the drive sprockets 51. As the drive sprockets oscillate toward the rear of the machine, they "walk" across the ridges 19 of the corrugated surface of the pipe without causing the pipe to be moved during that portion of the cycle. At that time, the rotating slitters 131 are pivoted toward the axis of the opening 133 and each pair of slitters cut into a pair of grooves 21 of the pipe 11 at a spacing such that slitting is accomplished in every other groove of the pipe. Rotation of the slitter arm cam 49 then causes the arms 117 to pivot away from the axis of the opening 133 just before the drive sprockets 51 are again moved toward the front of the machine and the cycle is then begun again.

If it is found that the timing of the slitter arm oscillation and the drive sprocket's movement is not correct to allow smooth operation of the machine, the specific timing therebetween may be adjusted by means of an adjustment device 141 which acts against the timing belt 47 to adjust the path of travel of the belt. As shown, the linkage comprises a pair of idler wheels 143 which are mounted on pivot levers 145 and are biased toward one another by a spring 147. One of the idler wheels 143, and the related lever 145, is pivoted to the end of a shaft 149 which is threadably attached to a rotatable shaft 151. Shaft 151 is fixed to a handle 153 on the outside of the frame 30. As the handle 153 is turned, it will move the positioning shaft 149 either toward or away from the handle and will thus move the idler wheels 143 in the same direction. When this occurs, the path of the timing belt 47 will be adjusted so that the relative angular relationship between the shaft 43, and thus the slitter arm cam 49, and the pulley 61 will be adjusted. In this manner the precise relationship between rotation of the drive sprockets 51 and oscillation of the arms 117 can thus be controlled to prevent the drive sprockets from beginning to draw the corrugated pipe through the machine before the slitter wheels 131 have been completely withdrawn therefrom.

Referring now to FIG. 6, it can be seen that the dancer 15 comprises a stand 161 which pivotally supports a crank arm 163. At one end of the crank arm, a dancer roller 165 is pivotally mounted so as to rest upon and roll over the upper surface of the corrugated pipe 11 as shown in FIG. 1.

At the other end of the crank arm, a sprocket or wheel 167 is pivotally mounted to drive a timing belt 169 which rotates a second wheel 171 in accordance with the turning of the crank arm 163. The second wheel 171 is fixedly mounted on a shaft 173 which operates a potentiometer 175 to control the rotational speed of the drive motor 31 through suitable circuitry (not shown).

Thus, as the radius of the catenary of the pipe between the die 13 and the slitter machine 17 increases and the pipe becomes straighter, the dancer roller 165 will cause the crank arm to pivot in a clockwise direction as viewed in FIGS. 1 and 6, causing the timing blet 169 to adjust the potentiometer 175 to a position in which the motor 31 slows down. On the other hand, as the radius of the catenary becomes smaller and the pipe 11 begins to drop toward the bottom of the stand 15, the dancer roller 165 will cause the crank arm 163 to rotate in the counterclockwise direction and the potentiometer 175 will cause the motor 31 to run at a faster speed to draw the pipe through the slitter machine at a greater velocity.

Thus, the applicant has disclosed one embodiment of a new and improved concept in the art of pipe manufacturing which yields a true advancement in that art since drainage piep can be manufactured from the raw material to a finished, usable product in a single mechanical operation which does not require handling of the pipe unitl after it is in the finished form. Many modifications and alterations of the above-described embodiment within the spirit of the invention will now become apparent to those skilled in the art without exceeding the scope of the invention as defined in the following claims, wherefore what is claimed as the invention is:

I claim:

1. A machine for partially slitting corrugated pipe comprising
   means for feeding the pipe past a plurality of slitters, including
   a pair of opposed drive means for gripping the pipe therebetween,
   means for rotating said drive means in opposite directions, and
   means for oscillating said drive means along an arc trangent to the axis of the pipe as it is moved,
   means for partially slitting the pipe including a plurality of slitter blades,
a like plurality of arms upon which said slitter blades are mounted,
means mounting said plurality of arms about the axis along which the pipe travels, and
means for oscillating said plurality of arms toward and away from the axis along which the pipe travels, and
means for measuring the catenary of the pipe as it is being moved by said feeding means and for controlling the speed of said feeding means and said arm oscillating means in accordance with the measurement.

2. The machine of claim 1 wherein
said pipe feeding means comprises
a pair of sprocket-like wheels having teeth therein for cooperaing with the grooves in the pipe.

3. The machine of claim 1 including
means for preventing movement of the pipe relative to said slitter blades when said plurality of arms are oscillated into positions nearest to the axis along which the pipe travels.

4. The machine of claim 1 wherein
said slitting means also includes
means for rotating said slitter blades.

5. The apparatus of claim 1 including
means for adjusting the angular position of rotation of said drive means relative to the oscillated position thereof.

6. The apparatus of claim 1 including
means for adjusting the angular position of rotation of said drive means relative to the oscillated position of said plurality of arms.

7. Apparatus for forming partial slits about the periphery of a tubular member comprising
means for feeding the tubular member past a plurality of slitters including
a pair of opposed drive means having
means for gripping the tubular member therebetween and
means for moving said drive means along an arc extending in substantially the same direction as the direction of movement of the tubular member and
means for partially slitting said tubular member including
a plurality of arms located at predetermined positions about the path along which the tubular member is moved by said feeding means,
means for oscillating said arms at predetermined intervals between
a first position adjacent the path of movement of the tubular member, and
a second position relatively distant from the path of movement of the tubular member, and
at least one slitter blade mounted on each of said arms so as to extend into the path of movement of the tubular member when said arms are in said first position.

8. The apparatus of claim 7 wherein
said gripping means are in continuous contact with the tubular member and
said pair of opposed drive means includes
means for causing movement of a tubular member held between said gripping means during oscillation thereof in a first direction and preventing movement of the tubular member held between said gripping means during oscillation thereof in the second direction.

9. The apparatus of claim 8 wherein
said arm oscillating means includes
means for positioning said arms in said first position when said gripping means is moved in the second direction and for positioning said arms in said second position when said gripping means is moved in the first direction.

10. The apparatus of claim 7 wherein
said means for moving said drive means comprises
a first cam and
said means for oscillating said arms comprises
a second cam,
said apparatus further including
a single power supply means for turning said first and second cams.

11. Apparatus for producing partial slits in the periphery of a corrugated pipe comprising
a base member
a power source mounted on said base member,
corrugated pipe gripping means mounted on said base member for continuously gripping a pipe moving through said base member,
means for transmitting power from said power source to said gripping means to cyclically translate said gripping means back and forth in the general direction of motion of the pipe through said base member,
means for transmitting power from said power source to said gripping means to constantly rotate said gripping means in a plane which is substantially parallel to the general direction of motion of the pipe through said base member,
at least one arm mounted on said base member adjacent the path of travel of the pipe therethrough and having
at least one slitter blade mounted thereon,
means for oscillating said at least one arm from
a first position in which said at least one slitter blade is located out of the path of travel of the pipe through said base member and
a second position in which said at least one slitter blade is located in the path of travel of the pipe through said base member,
means for transmitting power from said power source to said oscillating means, and
means for preventing travel of a pipe through said base member when said at least one arm is in said second position while allowing said gripping means to continue to translate and rotate in contact with the pipe.

12. The apparatus of claim 11 including
means for controlling the speed of rotation and translation of said gripping means and the speed of oscillation of said at least one arm in accordance with the quantity of pipe available to pass through said base member.

13. The apparatus of claim 11 including
means for rotating said at least one slitter blade.

14. The apparatus of claim 11 including
means for controlling the angle of rotation of said gripping means relative to the location of transfer thereof.

15. The apparatus of claim 11 including
a plurality of such arms and linkage interconnecting said plurality of arms to maintain simultaneous oscillation thereof.

16. The apparatus of claim 11 wherein a plurality of such slitter blades are mounted on said at least one arm and are so located as to produce slits in every other groove of a corrugated pipe passed through said base member.

* * * * *